(No Model.)  2 Sheets—Sheet 1.
G. D. HAWORTH.
CHECK ROWER.
No. 323,036. Patented July 28, 1885.
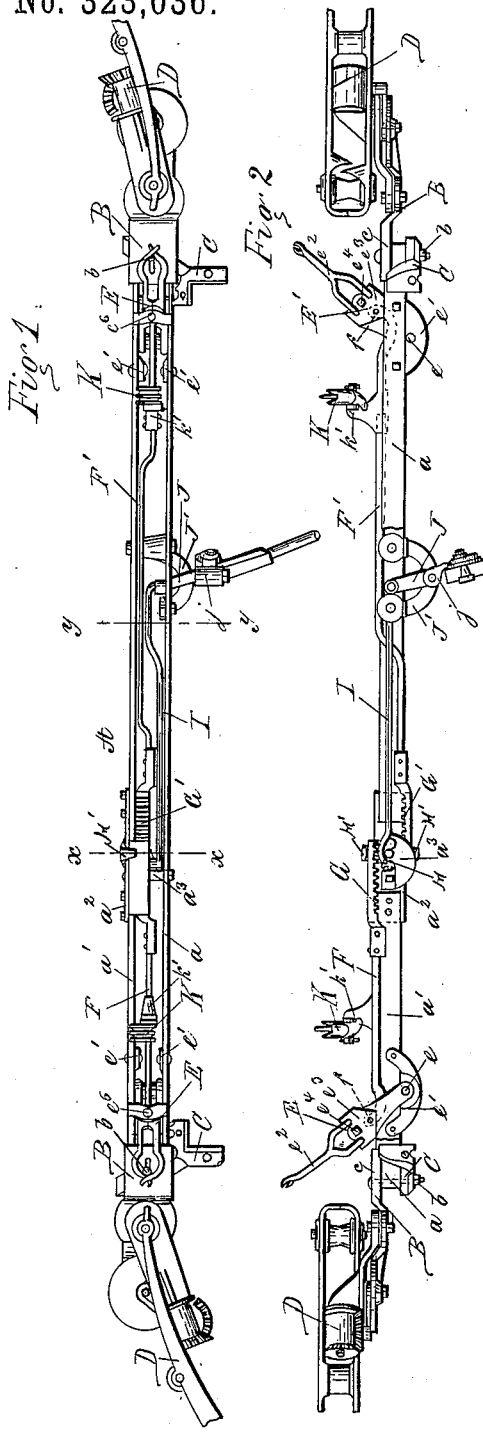
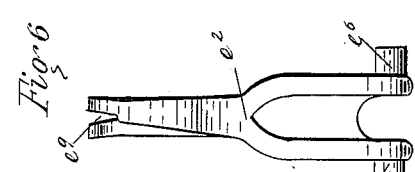
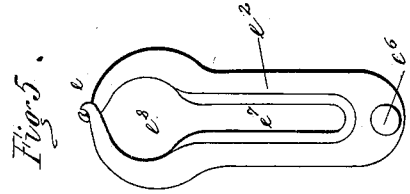
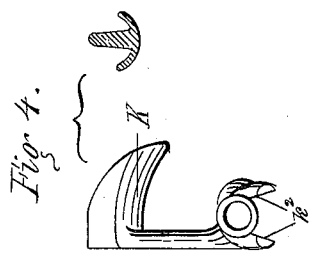
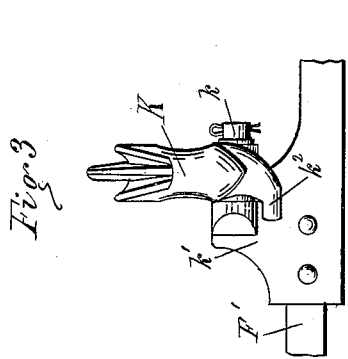
Witnesses
W. C. Corlies
P. E. Reinmemo
Inventor
George D. Haworth
By Osborne & Thrasher
Attorneys (No Model.) 2 Sheets—Sheet 2.
G. D. HAWORTH.
CHECK ROWER.
No. 323,036. Patented July 28, 1885.
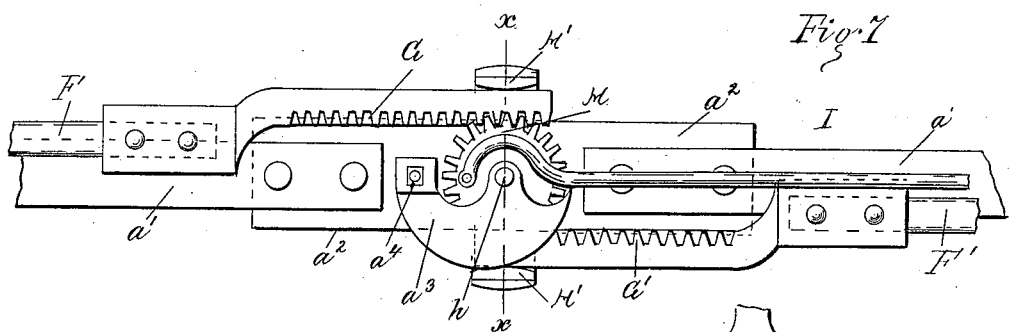
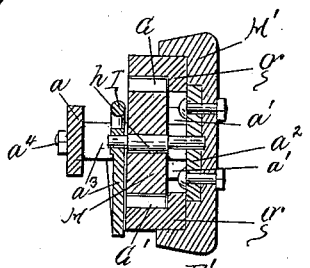
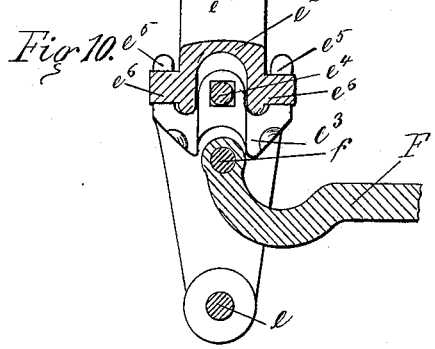
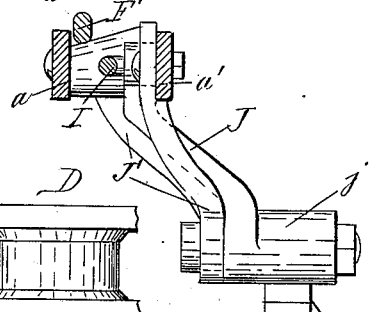
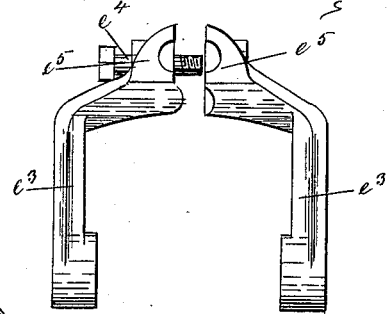
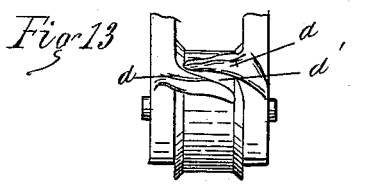
Witnesses
W. C. Coolies
P. E. Rennemo
Inventor
George D. Haworth
By Coburn & Thacher
Attorneys
N. PETERS, Photo-Lithographer, Washington, D. C.

UNITED STATES PATENT OFFICE.

GEORGE D. HAWORTH, OF CHICAGO, ILLINOIS.

CHECK-ROWER.

SPECIFICATION forming part of Letters Patent No. 323,036, dated July 28, 1885.

Application filed August 23, 1884. (No model.)

*To all whom it may concern:*

Be it known that I, GEORGE D. HAWORTH, a citizen of the United States, and residing at Chicago, in the county of Cook and State of Illinois, have invented certain new and useful Improvements in Check-Rowers, which are fully set forth in the following specification, reference being had to the accompanying drawings, in which—

Figure 1 is a plan view of a check-row bar embodying my improvements; Fig. 2, a side elevation of the same. Figs. 3 and 4 are detail views of one of the guards; Figs. 5 and 6, detail views of one of the lever-arms. Fig. 7 is an elevation on an enlarged scale of the mechanism connecting the lever-arms; Fig. 8, a sectional view on the line $x\ x$, Figs. 1 and 7; Fig. 9, a sectional view on the line $y\ y$, Fig. 1; Fig. 10, a detail sectional view of one of the lever-arms and its connections; Fig. 11, an elevation of the lower part of Fig. 10, and Figs. 12 and 13 are detail views of the outer end of one of the guides.

Like letters refer to like parts in all the figures.

My invention relates to check-row planters, and is in the nature of an improvement on Patent No. 6,818, reissued to me December 21, 1875. In the present instance I have only shown those parts to which the improvements immediately relate, since their operation and relation to the whole machine will be readily understood upon reference to said patent.

In the drawings, A represents the transverse bar which supports the mechanism which guides the check-row wire or cord across the machine and intermittently transmits the motion it receives from said wire or cord to the seeding devices. This bar is constructed of two parallel flat wrought-iron rods, $a\ a'$, suitably connected with each other, and having attached to them at each end an upper plate or casting, B, and a lower plate or casting, C. The castings B form brackets, to which are secured guides D, to receive and guide the wire or cord as it enters and leaves the machine. The castings C form arms or brackets by which the bar A and its attachments are secured to the machine, and these brackets may be adjustable to adapt them to different machines. The castings are clamped upon the bar A by means of bolts $b$, and the upper casting is preferably provided with dependent flanges $c$ to embrace the bar A and prevent any slipping laterally.

E E' represent the lever-arms which are actuated by the knots on the check-lines to impart motion to the slides of the seeding devices. These lever-arms are each pivoted on an axis, $e$, mounted in brackets $e'$, attached to the bars $a\ a'$, and have pivoted to them at $f$ pitmen-rods F F', respectively, the opposite or inner ends of which are provided with racks G G', which engage with the opposite sides of a pinion, H, mounted in the bar A. The pinion H has a pitman, I, which is pivoted to a vibrating lever, J, the lower end of which is connected with and operates the seeding-slides.

The lever-arm E consists of an upper part, $e^2$, and a lower part, $e^3$, this latter being in two parts connected by a bolt, $e^4$, and each having flanges $e^5$, notched to receive gudgeons $e^6$ on the upper part, $e^2$, whereby the upper part is pivoted to the lower part, $e^3$, so as to have a certain amount of play transversely to the line of oscillation of the lever-arm. This portion $e^2$ of the lever-arm is slotted, as shown at $e^7$, to receive the check-line, the edges of the slot being beveled to give the buttons thereon a better bearing, and this slot terminates at its upper end in an opening, $e^8$, of sufficient size to admit of the passage of the buttons. The upper ends of the part, $e^2$ are not united, but are a sufficient distance apart to leave a space, $e^9$, Fig. 6, wide enough to admit the check-line, but these ends overlap each other sufficiently to prevent the line from slipping out accidentally.

The pinion H is preferably mounted in the following manner: The bar $a'$ is cut away and the ends thereof connected by a plate, $a^2$, in which, and in a bracket, $a^3$, mounted on a bolt, $a^4$, connecting plate $a^2$ and bar $a$, the shaft $h$ of pinion H has its bearing. The racks G G' have each a dependent flange, $g$, which fits between the pinion and plate $a^2$ to prevent the racks from slipping off the pinion laterally, and a retaining yoke or guide, H', shaped as shown in Figs. 7 and 8, is secured to the plate $a^2$ to retain the racks in mesh with the pinion.

The vibrating lever J is mounted on a stud, $j$, projecting from a bracket, J', secured to the bar A, as clearly shown in Figs. 1, 2, and 9, and its lower end is arranged to operate the seeding devices in any well-known manner.

On each of the pitmen F F', I attach, near the lever-arms E E', guards K. These guards K are constructed substantially as shown in Figs. 3 and 4, so that the check-line may be slipped into place, but will not be accidentally displaced on account of the shape of the guards and the tension on the line. These guards are preferably pivoted to swing in the same direction as the upper parts, $e^2$, of the lever-arms E E' on studs $k$, projecting from lugs $k'$ on the pitmen, and each guard has stops $k^2$ on its lower end, which engage with the sides of the lug $k'$ to limit its motion.

In Fig. 12 I have shown an improved form of guard for the guides D. These guides are of the general construction set forth in my patents No. 209,477, October 29, 1878, and No. 241,358, May 10, 1881. In the former patent guards or guiding-loops are shown, consisting of two lugs or arms, the lower one of which is horizontal, while the upper one overlaps it. In practice this construction is liable to cause the check-line to bind or catch between the arms, thus causing serious damage. To overcome this defect, I attach to the guide D lugs or arms $d$, one of which projects upward and the other downward, the two overlapping sufficiently to prevent the line from escaping accidentally, but having a space, $d'$, between their adjacent ends to permit the line to be slipped into or out of the guard when desired, while at the same time the line cannot catch or bind.

The operation of the device is as follows: The check-line is slipped into the guards and lever-arms instead of being led or strung through, and as the machine advances the line moves along the bar A and curved guides D, the pivoted lever-arms and guards accommodating themselves to the diagonal position assumed by the wire between the inner guide-pulleys of the curved guides D, thus greatly reducing the friction. When one of the buttons on said line comes in contact with the lever-arms E, it engages with the beveled walls of the slot $e^7$ and throws the said lever over to the opposite extremity of its arc of oscillation, and when the lever-arm has ceased to move the button will slide along the slot $e^7$ until it reaches the opening $e^8$, through which it will pass; but as soon as the lever-arm has passed the perpendicular in the course of the movement just described the button will have a tendency and be liable to slip along the slot and pass out of the opening before the lever-arm has finished its effective stroke. This is prevented by the guard K, which, being attached to the pitman F, has an up-and-down as well as a back-and-forth motion; but being attached nearer to the guide through which the pitman works than is the lever-arm its up-and-down motion is less—i.e., it swings in a flatter arc than does the lever-arm, and thereby holds the line down in the slot until the completion of the stroke, while at the same time it produces much less strain than if the guard were fixed. When the lever-arm E is swung over, it gives the pinion H a semi-rotation by means of the pitman F and rack G, thereby operating the seeding-slide in one direction through the pitman I and lever J, while at the same time, through rack G' and pitman F', the lever-arm E' is set in position to receive the knot after it leaves the lever-arm E, said knot operating said lever-arm E' in the same manner as it did E, and thereby producing, through the connecting devices, a motion of the seeding-slide in the opposite direction, and setting E in position to receive the next knot.

It is obvious that various mechanical changes may be made in the details of construction hereinbefore set forth without departing from the principles of my invention, and I therefore do not wish to be understood as limiting myself strictly to the precise construction shown and described.

Having thus described my invention, what I claim as new, and desire to secure by Letters Patent, is—

1. In a check-rower, the check-row bar A, for attachment to corn-planters, composed of the flat metallic parallel bars $a\ a'$, connected together, in combination with the mechanism whereby the seeding devices are actuated, substantially as and for the purposes specified.

2. In a check-rower, the combination, with the cross-bar, of lever-arms having pitmen provided with rigidly-attached racks to engage the opposite sides of a pinion having a pitman connected with the lever which operates the seeding devices, substantially as and for the purposes set forth.

3. In a check-rower, the combination, with the lever-arms, pitmen connected thereto, and suitable connecting mechanism for operating the seeding devices, of guards mounted on said pitmen, substantially as and for the purposes specified.

4. In a check-rower, the combination, with the swiveling guides, of the lever-arms, and guards pivoted to swing laterally, substantially as and for the purposes specified.

5. In a check-rower, the combination, with a pinion having a pitman connecting with the lever which operates the seeding devices, of the lever-arms having pitmen provided with racks to mesh with opposite sides of the pinion, the said racks being provided with flanges to retain them in position laterally, and a guide or yoke to retain the racks in position vertically, substantially as and for the purposes specified.

6. In a check-rower, the lever-arm composed of an upper part adapted to receive the check-line and having gudgeons at its lower end, and a lower part consisting of two portions notched to receive said gudgeons, and a connecting-bolt, substantially as and for the purposes set forth.

7. In a check-rower, the open inverted-L-shaped guard, K, pivoted on a stud projecting from a suitably-mounted lug, and having stops to engage with the opposite sides of said lug to limit its motion, substantially as and for the purposes specified.

8. In a check-rower, the combination, with the swiveling guide composed of an upper and a lower plate suitably connected together, of the guards formed by downwardly-projecting arms on the upper plate and upwardly-projecting arms on the lower plate, the ends of said arms overlapping and being arranged in substantially parallel planes a sufficient distance apart to admit the check-line, substantially as and for the purposes specified.

GEORGE D. HAWORTH.

Witnesses:
IRVINE MILLER,
W. C. CORLIES.